(12) United States Patent
Kaiser

(10) Patent No.: US 9,849,568 B2
(45) Date of Patent: Dec. 26, 2017

(54) CLAMPING DEVICE

(71) Applicant: DE-STA-CO Europe GmbH, Oberursel (DE)

(72) Inventor: Richard Kaiser, Bad Homburg vor der Hoehe (DE)

(73) Assignee: DE-STA-CO Europe GmbH, Oberursel (DE)

( * ) Notice: Subject to any disclaimer, the term of this patent is extended or adjusted under 35 U.S.C. 154(b) by 0 days.

(21) Appl. No.: 14/115,544

(22) PCT Filed: Apr. 18, 2013

(86) PCT No.: PCT/DE2013/100145
§ 371 (c)(1),
(2) Date: Nov. 4, 2013

(87) PCT Pub. No.: WO2013/163989
PCT Pub. Date: Nov. 7, 2013

(65) Prior Publication Data
US 2015/0145194 A1    May 28, 2015

(30) Foreign Application Priority Data
May 4, 2012 (DE) .................. 10 2012 103 921

(51) Int. Cl.
*B25B 5/12* (2006.01)
*B25B 5/10* (2006.01)
(Continued)

(52) U.S. Cl.
CPC .............. *B25B 5/122* (2013.01); *B25B 5/12* (2013.01); *B25B 5/16* (2013.01); *B30B 15/062* (2013.01);
(Continued)

(58) Field of Classification Search
CPC ........... B25B 5/087; B25B 5/122; B25B 5/16; B25B 1/00; B25B 3/00; B25B 5/00;
(Continued)

(56) References Cited

U.S. PATENT DOCUMENTS

| 150,900 A | * | 5/1874 | Silver | .................. B25B 1/125 12/103 |
| 679,935 A | * | 8/1901 | Behler | .................. F16B 39/06 411/205 |

(Continued)

FOREIGN PATENT DOCUMENTS

| DE | 20209237 | * | 9/2002 |
| DE | 20209237 U1 | | 10/2002 |

(Continued)

OTHER PUBLICATIONS

International Search Report and Written Opinion of the ISA (German), ISA/EP, Rijswijk, NL, dated Aug. 19, 2013.

*Primary Examiner* — Larry E Waggle, Jr.
*Assistant Examiner* — Mahdi H Nejad
(74) *Attorney, Agent, or Firm* — Harness, Dickey & Pierce, P.L.C.

(57) ABSTRACT

A clamping device has an actuator that moves linearly and is actuated by a drive. A pivoting clamping element is operatively connected, via a toggle lever mechanism, with the actuator. The toggle lever mechanism includes a drive-side adapter and a hand lever-side adapter. The drive side adapter and hand lever side adapter can be adjusted relative to one another to define an opening angle of the clamping element. One of the adapters has a profiled bar extending in a direction of actuation. The other adapter has an insertion region to accommodate the bar. A fixing element is provided in one of the adaptors to define the location of the adapters (Continued)

relative to one another. The fixing element can be clamped against the profiled bar and also against an insertion region.

19 Claims, 2 Drawing Sheets

(51) Int. Cl.
  *F16B 39/10* (2006.01)
  *B25B 5/16* (2006.01)
  *B30B 15/06* (2006.01)
  *B44B 5/02* (2006.01)
  *B44F 9/02* (2006.01)

(52) U.S. Cl.
  CPC .............. *B44B 5/026* (2013.01); *F16B 39/10* (2013.01); *B44F 9/02* (2013.01); *Y10T 428/24355* (2015.01); *Y10T 428/24479* (2015.01); *Y10T 428/24545* (2015.01)

(58) Field of Classification Search
  CPC .... B25B 7/00; B25B 5/10; B25B 5/12; B25B 5/026; F16B 35/005; F16B 39/10; Y10T 74/19735; Y10T 74/19805; B23Q 3/08
  USPC .. 269/32, 71, 47, 67, 76, 66, 186, 195, 223, 269/240, 182, 174, 248, 243, 270, 189, 269/222, 228; 411/393, 120; 74/424.78, 74/424.94
  See application file for complete search history.

(56) References Cited

U.S. PATENT DOCUMENTS

| | | | | | |
|---|---|---|---|---|---|
| 924,122 | A * | 6/1909 | Williams | ................ | B30B 1/18 100/229 R |
| 1,397,595 | A * | 11/1921 | Moyer | ................ | E21B 19/08 403/118 |
| 1,406,315 | A * | 2/1922 | Whittaker | ............... | F16B 39/04 411/294 |
| 1,467,039 | A * | 9/1923 | Hume | ................ | F16K 31/56 74/424.78 |
| 1,505,205 | A * | 8/1924 | Kilgour, Jr. | ............ | B23D 21/08 269/182 |
| 1,721,227 | A * | 7/1929 | Manley | ................ | G05G 5/06 188/265 |
| 1,884,914 | A * | 10/1932 | Hall | ................ | B21K 21/08 29/890.142 |
| 1,963,667 | A * | 6/1934 | Mercier | ................ | F16B 39/04 411/295 |
| 2,463,263 | A * | 3/1949 | Gordon | ................ | B25B 5/101 269/182 |
| 2,475,939 | A * | 7/1949 | Applezweig | ............ | A61M 5/24 604/201 |
| 2,631,357 | A * | 3/1953 | Gobel | ................ | B23B 51/05 269/174 |
| 2,644,498 | A * | 7/1953 | Malecki | ................ | B25B 1/125 269/182 |
| 2,664,768 | A * | 1/1954 | Clyne | ................ | B23Q 16/001 33/430 |
| 2,671,482 | A * | 3/1954 | Gordon | ................ | B25B 1/125 269/182 |
| 2,754,871 | A * | 7/1956 | Stoll | ................ | F16B 39/30 411/283 |
| 2,755,681 | A * | 7/1956 | Merriman | ................ | B25B 5/101 269/212 |
| 2,788,681 | A * | 4/1957 | Kling | ................ | F16H 3/003 74/810.1 |
| 2,839,914 | A * | 6/1958 | Syler | ................ | E05B 37/00 70/156 |
| 2,874,877 | A * | 2/1959 | Spencer | ................ | B41F 31/02 222/162 |
| 3,169,761 | A * | 2/1965 | Herrington | ............ | B25B 1/241 269/248 |
| 3,206,249 | A * | 9/1965 | Gateley | ................ | A47C 7/546 108/154 |
| 3,599,960 | A * | 8/1971 | Phillips | ................ | B25B 1/125 269/182 |
| 4,645,395 | A * | 2/1987 | Lundgren | ............... | F16B 39/04 411/210 |
| 4,749,320 | A * | 6/1988 | Gutt | ................ | F16B 39/34 411/304 |
| 4,884,814 | A * | 12/1989 | Sullivan | ............ | A63B 37/0003 473/372 |
| 4,884,914 | A * | 12/1989 | Shultz | ................ | B25B 5/10 248/354.4 |
| 5,134,731 | A * | 8/1992 | Quintile | ............... | A47C 19/045 192/141 |
| 5,408,734 | A * | 4/1995 | Mills | ................ | B25B 27/023 29/264 |
| 5,454,674 | A * | 10/1995 | Eriksson | ................ | F16B 39/02 411/295 |
| 5,529,450 | A * | 6/1996 | Mesolella | ............ | F16B 39/028 411/295 |
| 5,848,557 | A * | 12/1998 | Sugiki | ................ | B62D 1/181 403/362 |
| 5,911,215 | A * | 6/1999 | Fisher, Jr. | ............ | F41B 5/1438 124/86 |
| 5,913,509 | A * | 6/1999 | Price | ................ | B25B 5/068 269/246 |
| 6,220,588 | B1 * | 4/2001 | Tunkers | ................ | B25B 5/061 269/32 |
| 6,428,257 | B2 * | 8/2002 | Ostling | ................ | F16B 39/04 411/295 |
| 6,752,066 | B2 * | 6/2004 | Varetto | ................ | B25B 5/122 92/17 |
| 6,938,450 | B1 * | 9/2005 | Zhang | ................ | B30B 15/045 100/214 |
| 7,052,334 | B1 * | 5/2006 | Cabay | ................ | H01R 11/15 411/326 |
| 7,066,459 | B2 * | 6/2006 | Tunkers | ................ | B25B 5/12 269/240 |
| 7,607,876 | B2 * | 10/2009 | Hall | ................ | B30B 11/004 411/110 |
| 7,775,559 | B2 * | 8/2010 | Steinbock | ............ | E21B 17/085 285/404 |
| 8,459,626 | B2 * | 6/2013 | Sawdon | ................ | B25B 5/062 269/228 |
| 8,777,200 | B2 * | 7/2014 | Ulle | ................ | B25B 5/122 269/228 |
| 2002/0149147 | A1 * | 10/2002 | Schauss | ................ | B25B 5/16 269/228 |
| 2006/0197270 | A1 * | 9/2006 | Migliori | ................ | B25B 5/12 269/228 |
| 2011/0277280 | A1 * | 11/2011 | Blaauw | ................ | B25B 5/122 24/568 |
| 2013/0180746 | A1 * | 7/2013 | Su | ................ | B25D 17/00 173/90 |
| 2014/0339753 | A1 * | 11/2014 | Fukui | ................ | B25B 5/122 269/228 |
| 2015/0076757 | A1 * | 3/2015 | Shula | ................ | B25B 5/006 269/95 |
| 2015/0145195 | A1 * | 5/2015 | Fukui | ................ | B25B 5/16 269/32 |

FOREIGN PATENT DOCUMENTS

| | | | |
|---|---|---|---|
| DE | 102004007346 B3 * | 4/2005 | |
| DE | 102009054153 * | 5/2011 | |
| DE | 102009054153 A1 * | 5/2011 | |
| EP | 1 533 080 A2 * | 9/2004 | |
| EP | 1524081 A2 | 4/2005 | |
| FR | 1167676 A * | 11/1958 | |
| FR | 2839914 * | 3/2003 | |
| FR | 2839914 A1 * | 3/2003 | |
| FR | 2839914 * | 11/2003 | |
| WO | WO 03/011528 A1 * | 2/2003 | ............ B25B 5/087 |
| WO | WO 03/011528 A1 * | 2/2013 | |

* cited by examiner

CLAMPING DEVICE

CROSS REFERENCE TO RELATED APPLICATIONS

This application is a 371 US National Phase of PCT/DE2013/100145, filed Apr. 18, 2013, which claims priority to German Patent Application DESN 102012103821.6, filed May 4, 2012, the entire disclosures of which applications are incorporated by reference herein.

FIELD

The disclosure relates to a clamping device with an actuator that moves linearly and is actuated by a drive. A pivoting clamping element is operatively connected, via a toggle lever mechanism, with the actuator. The toggle lever mechanism includes a drive-side adapter and a hand lever-side adapter. The drive side adapter and hand lever side adapter can be adjusted relative to one another to define an opening angle of the clamping element.

BACKGROUND

A clamping device is known from DE 202 09 237 U1. Here an actuator is able to move linearly and may be actuated by a drive, typically a pneumatic cylinder. The actuator is designed to be operatively connected, via a toggle lever mechanism, to a pivotably mounted clamping element (also called a clamping arm). The clamping element has an adapter part on the drive side and an adapter part on the toggle lever-side. The adapter parts are designed to be displaceable relative to one another via a gearing arrangement and tensioning screw. The adapter parts are directed toward one another in order to define an opening angle of the clamping device.

SUMMARY

It is an object of the disclosure to improve the above described clamping device.

According to the disclosure, one of the adapter parts comprises a profiled bar extending in the direction of actuation. The other adapter part has an insertion region in the form of a cavity to accommodate the bar. A fixing element defines the location of the adapters relative to one another. The fixing element may be clamped against both the profiled bar and against the insertion region.

According to the disclosure, one adapter part is designed such that it is able to be inserted into the other adapter part, or in a cavity in the other adapter part. Thus, the one adapter part position may be fixed. This results in an overall distribution of forces in both components, which are exposed to high loads, together with improved adjustability of the opening angle. This will be explained in greater detail below.

Other objects and advantageous refinements will become apparent to those skilled in the art. The clamping device according to the disclosure with its advantageous refinements will be explained in greater detail with reference to the diagrammatical representation of two embodiments. Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figures 1, 2, 3:
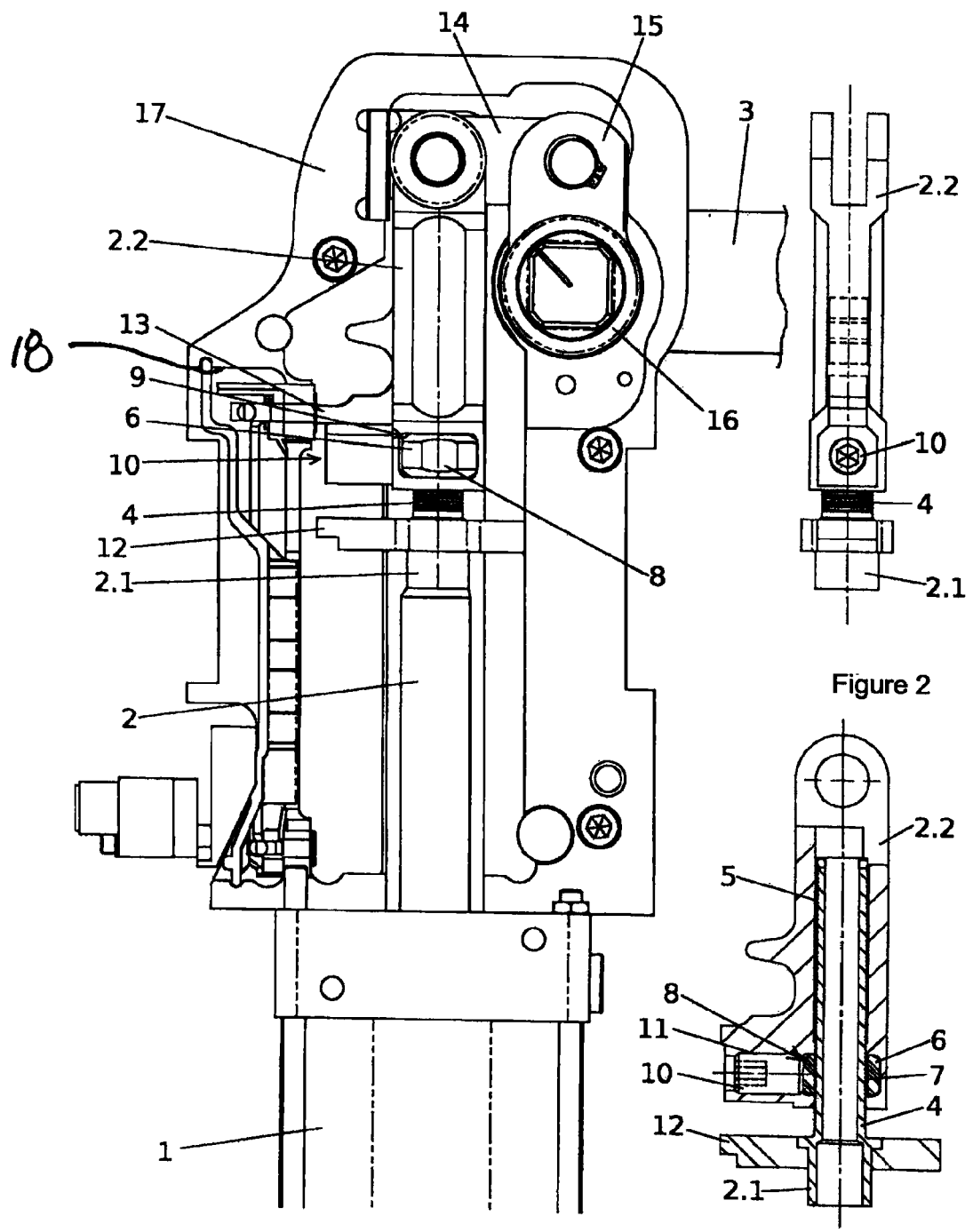
FIG. 1 is a cross-section of a clamping device with an adapter part.
FIG. 2 is a side view of the adapter part of FIG. 1.
FIG. 3 is a cross-section of the adapter part of FIG. 1.
Figure 4:
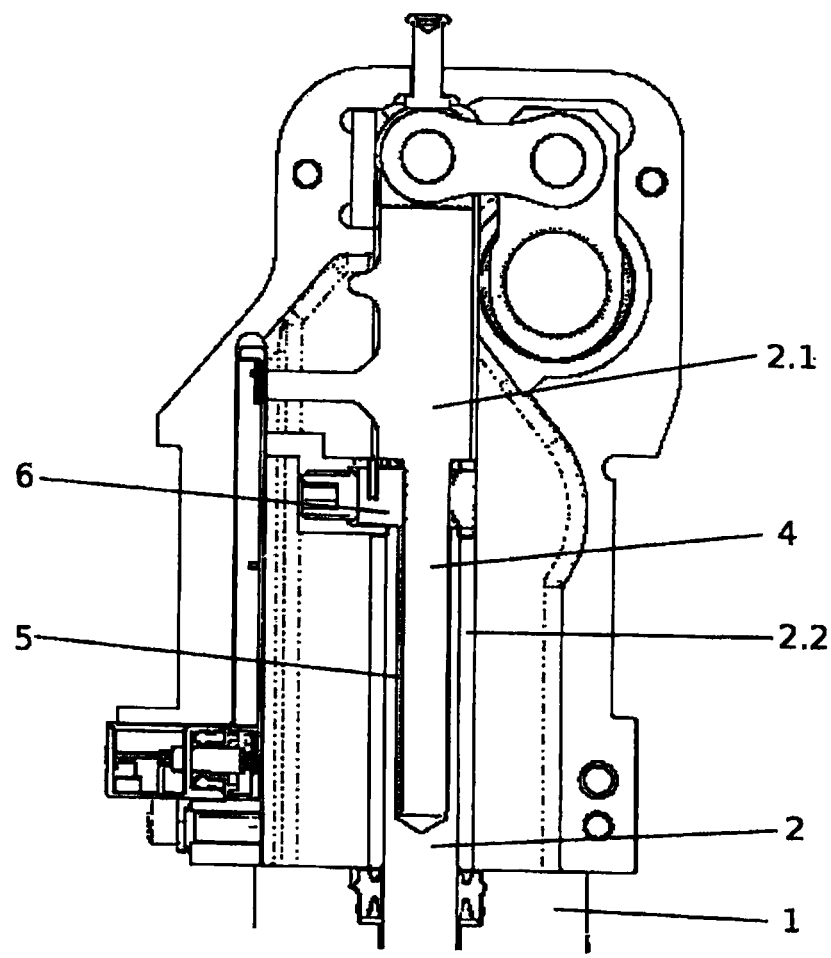
FIG. 4 is a cross-section of another embodiment of the clamping device where a bar is arranged on the adapter part on the toggle lever side and the insertion area is arranged on the adapter part on the drive side.

The clamping device illustrated in FIGS. 1 and 4 includes an actuator 2 that is able to move linearly. The actuator 2 may be actuated by a drive 1. The drive 1 may be a pneumatic or hydraulic drive unit with a piston and piston rod. The actuator 2 is connected directly to a piston rod of the drive 1. The actuator 2 is also operatively connected to a pivotably mounted clamping element 3 or "clamping arm" via a toggle lever mechanism. Viewing FIG. 1 in a little more detail, adapter part 2.2 and 2.1, on the toggle lever side, is designed to be connected in an articulated manner to a tab 14. Tab 14 is, in turn, connected in an articulated manner to a lever arm 15. The lever arm 15 is connected, in a non-rotating manner, to a pivoting shaft of the clamping element 3. Actuator 2 further has one adapter part 2.1 on the drive side and one adapter part 2.2 on the toggle lever side. Both adapter parts are designed to be movable toward one another so as to fix an opening angle of the clamping element 3.

As indicated in FIGS. 2, 3 and 4, one of the adapter parts 2.1 includes a profiled bar 4 extending in the direction of actuation. The other adapter part 2.2 includes an insertion region 5 that at least partly surrounds the bar 4, to accommodate the bar 4 and to completely surround the bar 4. A fixing element 6 is provided in the adapter part 2.2. The fixing element 6 may be clamped against both the profiled bar 4 and against the insertion region 5. This fixes the position of the adapter parts 2.1, 2.2 relative to one another.

Here, the fixing element 6 is designed as a ring. The fixing element 6 is penetrated by the bar 4. The fixing element 6 has an inner and an outer wall. The inner wall has a profiling 7 that matches the profiled bar 4 in a form fitting manner. The outer wall has a plurality, preferably four to eight, planar surfaces 8. In this case, fixing element 6 is in the form of a screw nut or is a screw nut. It is also constructed to completely surround the profiled bar 4. Profiling 7 of the inner wall as well as the profiling of the bar 4 are constructed as internal threads, with no pitch. In this context, the term "with no pitch" is understood to mean a thread with a "zero" pitch. Thus, it is not a true thread per se but simply a gearing arrangement that looks like a thread.

In order to be able to fix the position of the two adapter parts 2.1, 2.2 relative to one another, the diameter of the bar 4, in the region of its profiling, is always designed to be smaller than a diameter defined by the inner wall of the fixing element 6. In the embodiment of FIGS. 1 to 3, fixing element 6 is also arranged in an insertion opening 9 on the adapter part 2.2, on the toggle lever side. The fixing element 6 is secured against shifting in the primary axial direction of actuator 2. In the embodiment of FIG. 4, fixing element 6 is arranged in an insertion opening on the drive-side adapter part 2.2. As a result of the two diameters, fixing element 6 is thus designed to be displaceable, or offsettable, transversely but not longitudinally with regard to the bar 4.

In addition, an adjustment element 10 is also provided on the adapter part 2.2, on the toggle lever side (FIGS. 1 to 3), and on the drive side (FIG. 4). This shifts the fixing element 6 transverse to the main axial direction of the actuator 2, and towards the profiled bar 4. Accordingly, this adjustment element 10 is designed as a screw, particularly a grubscrew, guided in an aligned thread 11 and oriented transverse to the bar 4, on the adapter part 2.2. Moreover, an aperture 18, closable with a cap element if necessary, is provided on the housing 17 of the clamping device. The aperture 18 enables actuating adjustment of the element 10 from outside the clamping device.

As is known from DE 10 2009 054 153 A1, an end position encoder 12, 13 is also provided on each adapter part 2.1, 2.2. These end position encoders cooperate with corresponding sensors to obtain the adjustment position of the clamping arm. According to one particularly preferred embodiment (see FIGS. 1 to 3), the fixing element 6 is arranged between the two end position encoders (12, 13). In FIG. 4 it is arranged at the end position encoder 13 of the adapter 2.2 on the toggle lever side.

Adjustment of the clamping device according to the invention is carried out as follows:

The starting point of the consideration are adapter parts 2.1 and 2.2, The adapter parts 2.2 and 2.1 are fixed with respect to one another. In order to change the opening angle of the clamping element 3, the cap is removed from aperture 18. Then, the grubscrew (adjustment element 10) is taken out with an Allen key. The adjustment element 10 is constructed as an inner inbuss and is oriented so that its actuation side faces toward aperture 18. The result of this is that the profiling of fixing element 6 disengages from the profiling of the bar 4. Thus, the two adapter parts 2.1, 2.2 can now be displaced lengthwise with respect to one another. Once the desired position has been reached, the fixing element 6 is tightened against the bar 4 by again tightening adjustment element 10. Thus, the two adapter parts 2.1, 2.2 are fixed against one another again. Finally the cover is re-inserted into aperture 18 and the adjustment of the opening angle is complete.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

The invention claimed is:

1. A clamping device comprising:
an actuator that moves linearly and is actuated by a drive;
a pivoting clamping element is operatively connected, via a toggle lever mechanism, with the actuator;
the toggle lever mechanism includes a drive-side adapter and a toggle lever-side adapter, the drive-side adapter and the toggle lever-side adapter can be adjusted relative to one another to define an opening angle of the clamping element;
one of the adapters has a profiled bar extending in a direction of actuation, the other adapter has an insertion region to accommodate the bar;
a fixing element is provided in the insertion region of said the other adapter to define a location of the adapters relative to one another, the fixing element is penetrated by the profiled bar and is clamped against both the profiled bar of said one of the adapters and also against the insertion region of said the other adapter when the fixing element is in its clamped position; and
an adjustment element including a setscrew guided in a threaded hole of said the other adapter from outside of said the other adapter, transverse to the bar to force the fixing element to clamp against the profiled bar.

2. The clamping device according to claim 1, wherein the fixing element is designed as a ring penetrated by the bar with an inner and an outer wall, the inner wall has profiling that matches up with the bar in a form fitting manner and the outer wall has a plurality of plane surfaces.

3. The clamping device according to claim 2, wherein a diameter of the bar in its profiling region is always smaller than a diameter defined by the inner wall of the fixing element.

4. The clamping device according to claim 1, wherein the fixing element is arranged in an insertion opening on the toggle lever-side adapter and is secured in the latter against any displacement in a main axial direction of the actuator.

5. The clamping device according to claim 1, wherein the fixing element completely encloses the bar.

6. The clamping device according to claim 1, wherein the adjustment element is provided on the toggle lever-side adapter, the adjustment element displaces the fixing element transverse to a main axial direction of the actuator and against the profiled bar.

7. The clamping device according to claim 1, wherein an end position encoder is provided on each adapter and the fixing element is arranged between the two end position encoders.

8. The clamping device according to claim 1, wherein the fixing element is arranged on an end position encoder of the toggle lever-side adapter.

9. The clamping device according to claim 1, wherein the insertion region completely encloses the bar.

10. A clamping device comprising:
an actuator that moves linearly and is actuated by a drive;
a pivoting clamping element is operatively connected, via a toggle lever mechanism, with the actuator;
the toggle lever mechanism includes a drive-side adapter and a toggle lever-side adapter, the drive-side adapter and the toggle lever-side adapter can be adjusted relative to one another to define an opening angle of the clamping element;
one of the adapters has a profiled bar extending in a direction of actuation, the other adapter has an insertion region to accommodate the bar;
a fixing element is provided in the insertion region of said the other adapter to define a location of the adapters relative to one another, the fixing element is penetrated by the profiled bar and is clamped against both the profiled bar of said one of the adapters and also against the insertion region of said the other adapter when the fixing element is in its clamped position; and
an adjustment element including a threaded member in said the other adapter abutting against an outer wall of the fixing element, the threaded member moving the fixing element into its clamped position, clamping the fixing element against the profiled bar.

11. The clamping device according to claim 10, wherein the fixing element is designed as a ring penetrated by the bar with an inner and an outer wall, the inner wall has profiling that matches up with the bar in a form fitting manner and the outer wall has a plurality of plane surfaces.

12. The clamping device according to claim 11, wherein a diameter of the bar in its profiling region is always smaller than a diameter defined by the inner wall of the fixing element.

13. The clamping device according to claim 10, wherein the fixing element is arranged in an insertion opening on the toggle lever-side adapter and is secured in the latter against any displacement in a main axial direction of the actuator.

14. The clamping device according to claim 10, wherein the fixing element completely encloses the bar.

15. The clamping device according to claim 10, wherein the adjustment element is provided on the toggle lever-side adapter, the threaded member displaces the fixing element transverse to a main axial direction of the actuator and against the profiled bar.

16. The clamping device according to claim 15, wherein the threaded member is a screw guided in a thread, oriented transverse to the bar, provided in the toggle lever-side adapter.

17. The clamping device according to claim 10, wherein an end position encoder is provided on each adapter and the fixing element is arranged between the two end position encoders.

18. The clamping device according to claim 10, wherein the fixing element is arranged on an end position encoder of the toggle lever-side adapter.

19. The clamping device according to claim 10, wherein the insertion region completely encloses the bar.

* * * * *

UNITED STATES PATENT AND TRADEMARK OFFICE
CERTIFICATE OF CORRECTION

PATENT NO. : 9,849,568 B2
APPLICATION NO. : 14/115544
DATED : December 26, 2017
INVENTOR(S) : Richard Kaiser It is certified that error appears in the above-identified patent and that said Letters Patent is hereby corrected as shown below:

In the Specification

Column 1
Line 8 "102012103821.6" should be --102012103921.6--.

Signed and Sealed this
Twenty-fifth Day of September, 2018

Andrei Iancu
*Director of the United States Patent and Trademark Office*